US012273970B2

(12) United States Patent
Encinas et al.

(10) Patent No.: US 12,273,970 B2
(45) Date of Patent: Apr. 8, 2025

(54) ILLUMINATION DEVICE FOR A MOTOR VEHICLE, MORE PARTICULARLY HIGH-RESOLUTION HEADLAMP

(71) Applicant: HELLA GmbH & Co. KGaA, Lippstadt (DE)

(72) Inventors: Alberto Encinas, Lippstadt (DE); Florian Herold, Bielefeld (DE); Oliver Hetzel, Ruethen (DE); Ingo Moellers, Rietberg (DE); Martin Pluempe, Paderborn (DE); Florian Turkewitsch, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 110 days.

(21) Appl. No.: 18/125,496

(22) Filed: Mar. 23, 2023

(65) Prior Publication Data

US 2023/0232511 A1 Jul. 20, 2023

Related U.S. Application Data

(63) Continuation of application No. PCT/EP2021/075928, filed on Sep. 21, 2021.

(30) Foreign Application Priority Data

Sep. 24, 2020 (DE) ..................... 10 2020 124 960.8

(51) Int. Cl.
*H05B 45/10* (2020.01)
*H05B 45/325* (2020.01)

(52) U.S. Cl.
CPC ........... *H05B 45/10* (2020.01); *H05B 45/325* (2020.01)

(58) Field of Classification Search
CPC ...... H05B 45/10; H05B 45/30; H05B 45/325; H05B 47/10; H05B 47/125
See application file for complete search history.

(56) References Cited

U.S. PATENT DOCUMENTS

2016/0323035 A1* 11/2016 Jovicic ............... H04B 10/0795
2018/0242413 A1 8/2018 Hue et al.
(Continued)

FOREIGN PATENT DOCUMENTS

CN 108462534 B * 4/2023 ............... G06T 7/70
DE 102015012808 A1 4/2017
(Continued)

OTHER PUBLICATIONS

International Search Report dated Jan. 14, 2022 in corresponding application PCT/EP2021/075928.

*Primary Examiner* — Jimmy T Vu
(74) *Attorney, Agent, or Firm* — Muncy, Geissler, Olds & Lowe, P.C.

(57) ABSTRACT

An illumination device having a light-emitting diode field and an adjustable current source for each LED. The current source delivers a pulse width modulated current having a pulse height. An open-loop/closed-loop controller is provided for the open-loop/closed-loop control of the brightness of the LEDs. A setpoint value for the pulse height can be produced for the current source. A brightness value can be specified for each LED in accordance with the setpoint value, encoded in a video signal, and provided at a video signal output. The light-emitting diode field has a decoder, which is connected to the video signal input and via which the brightness value can be decoded from the video signal and converted into a duty cycle with which the pulse height can be produced.

9 Claims, 2 Drawing Sheets

(56) References Cited

U.S. PATENT DOCUMENTS

| | | | |
|---|---|---|---|
| 2020/0084848 | A1 | 3/2020 | Bonne et al. |
| 2020/0084853 | A1 | 3/2020 | Bonne et al. |

FOREIGN PATENT DOCUMENTS

| | | | |
|---|---|---|---|
| EP | 3496513 | A1 | 6/2019 |
| WO | WO2019170270 | A1 | 9/2019 |

* cited by examiner

ILLUMINATION DEVICE FOR A MOTOR VEHICLE, MORE PARTICULARLY HIGH-RESOLUTION HEADLAMP

This nonprovisional application is a continuation of International Application No PCT/EP2021/075928, which was filed on Sep. 21, 2021, and which claims priority to German Patent Application No 10 2020 124 960.8 which was filed in Germany on Sep. 24, 2020, and which are both herein incorporated by reference.

BACKGROUND OF THE INVENTION

Field of the Invention

The present invention relates to an illumination device for a motor vehicle, more particularly a high-resolution headlight, comprising a light-emitting diode field having n LEDs and having an adjustable current source for each LED, wherein each adjustable current source delivers a pulse width modulated current having a pulse height to power the associated LED, an open-loop and/or closed-loop controller for the open-loop and/or closed-loop control of the brightness of the LEDs of the light-emitting diode field, wherein the open-loop and/or closed-loop controller can be used to produce and provide a setpoint value for a pulse height of the pulse width modulated current at least for each adjustable current source, and wherein a brightness value can be specified with the open-loop and/or closed-loop controller for each LED in accordance with the setpoint value for the pulse height of the adjustable current source associated with the LED and encoded in a video signal and provided at a video signal output, wherein the light-emitting diode field has a video signal input, which is connected to the video signal output of the open-loop and/or closed-loop controller, and wherein the light-emitting diode field has a decoder which is connected to the video signal input and by means of which the brightness value can be decoded from the video signal for each LED and can be converted into a duty cycle with which the pulse width modulated current can be produced by the adjustable current source associated with the LED with a pulse height in accordance with the setpoint value predetermined for the current source by the closed-loop and/or open-loop controller.

DESCRIPTION OF THE BACKGROUND ART

In modern motor vehicles, it is important to use an illumination device, for example, a headlight, which makes it possible to achieve a desired or specifiable light distribution.

For this purpose, it is necessary to use sufficiently strong light sources with which the desired light distribution can be realized at all. However, a desired light distribution is not solely dependent on a strong light source. Furthermore, it is important that the light source can have different brightness values in different areas. In the recent past, light-emitting diodes which are assembled in large numbers to form light-emitting diode fields have proven advantageous for this purpose. However, it can remain problematic in this case that the light-emitting diodes in the light-emitting diode field do not automatically provide the light distribution that is desired. Accordingly, the brightness values in areas of the surface to be illuminated must be adapted to the desired light distributions. For this purpose, it is necessary to reduce or dim the brightness values of the light-emitting diodes. The desired brightness values of the light-emitting diodes can be transmitted to the light-emitting diode field via a video signal, for example.

A possibility for influencing the brightness values of the light-emitting diodes is pulse width modulation, in which the brightness values are adjusted by clocked switching on and off of the light-emitting diodes within a clock period. This is usually done with a constant pulse height of the current.

The described approach has the disadvantage that the losses are relatively high in relation to the brightness values emitted by the light-emitting diodes. By reducing the pulse height of the current and increasing the duty cycle within a clock period, a lower power loss can be achieved while maintaining the same brightness values. With today's illumination devices, it is not possible to change the pulse height while simultaneously changing the duty cycle during operation of the illumination device, as transit time differences can result in the signals for the pulse height of the current and the brightness values. The signals are transmitted to the power sources via different channels. The setpoint values for the pulse heights are supplied by the open-loop and/or closed-loop controller directly to the current sources. The duty cycles are transmitted as brightness values in a video signal that must be decoded. These transit time differences of the signals lead to a short-term change in the desired light distribution.

SUMMARY OF THE INVENTION

It is therefore an object of the present invention to propose an illumination device for a motor vehicle and a method for minimizing or completely eliminating the transit time differences of the signals.

In an exemplary embodiment, the object is achieved according to the invention in that the setpoint values for the pulse height of the current can also be encoded in the video signal by the open-loop and/or closed-loop controller and can also be decoded from the video signal by the decoder and can be used by the current sources to set the level of the current, i.e., the pulse height of the pulse width modulated current.

By using the video signal to transmit both the brightness values of the individual LED and the pulse height of the current, both signals are present at the video signal input of the light-emitting diode field at exactly the same time and can be processed by the decoder. The signals are synchronized by the frame-by-frame transmission in the video signal. This makes it possible to adjust the pulse height of the current and at the same time to adjust the duty cycles determined from the brightness values. With this approach, the light distribution of the illumination device can occur as desired despite the change in duty cycles and pulse heights. The observer who sees the light distribution of the illumination device from the outside does not recognize the adjustment of the pulse height of the current and the duty cycles. In particular, a very brief change in illumination is avoided, which would appear as flickering to the viewer.

It can be provided that the video signal is an RGB signal. When a video signal is used to transmit the brightness values, they are encoded in the useful range of the video signal. There is a possibility that the setpoint values for the pulse height of the current are encoded in the unused area, i.e., the blanking area of the video signal.

Furthermore, it can be provided that the adjustable current sources operate according to a master-slave principle, wherein at least one of the adjustable current sources as a master specifies the pulse height and duty cycle of the current and transmits them to the remaining adjustable current sources.

It can be provided that a motor vehicle is equipped with an illumination device of the invention.

It can be provided that the method for operating an illumination device of the invention for a motor vehicle has at least the steps: the open-loop and/or closed-loop controller produces a setpoint value for a pulse height of the pulse width modulated current at least for each adjustable current source associated with an LED and provides this setpoint value and specifies a brightness value for each LED in accordance with the setpoint value for the pulse height, the open-loop and/or closed-loop controller encodes the setpoint value for the pulse height of the pulse width modulated current and the brightness value for each LED in a video signal and provides it at a video signal output, the decoder is connected to the video signal input of the light-emitting diode field and decodes the brightness value from the video signal for each LED and converts it into a duty cycle, the decoder decodes the setpoint values for the pulse height of the current, and the adjustable current sources use these to set the level of the current, i.e., the pulse height of the pulse width modulated current.

It is possible that with constant brightness values for each LED of the light-emitting diode field, a simultaneous change of the setpoint values for the pulse height of the pulse width modulated current and the duty cycles takes place.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
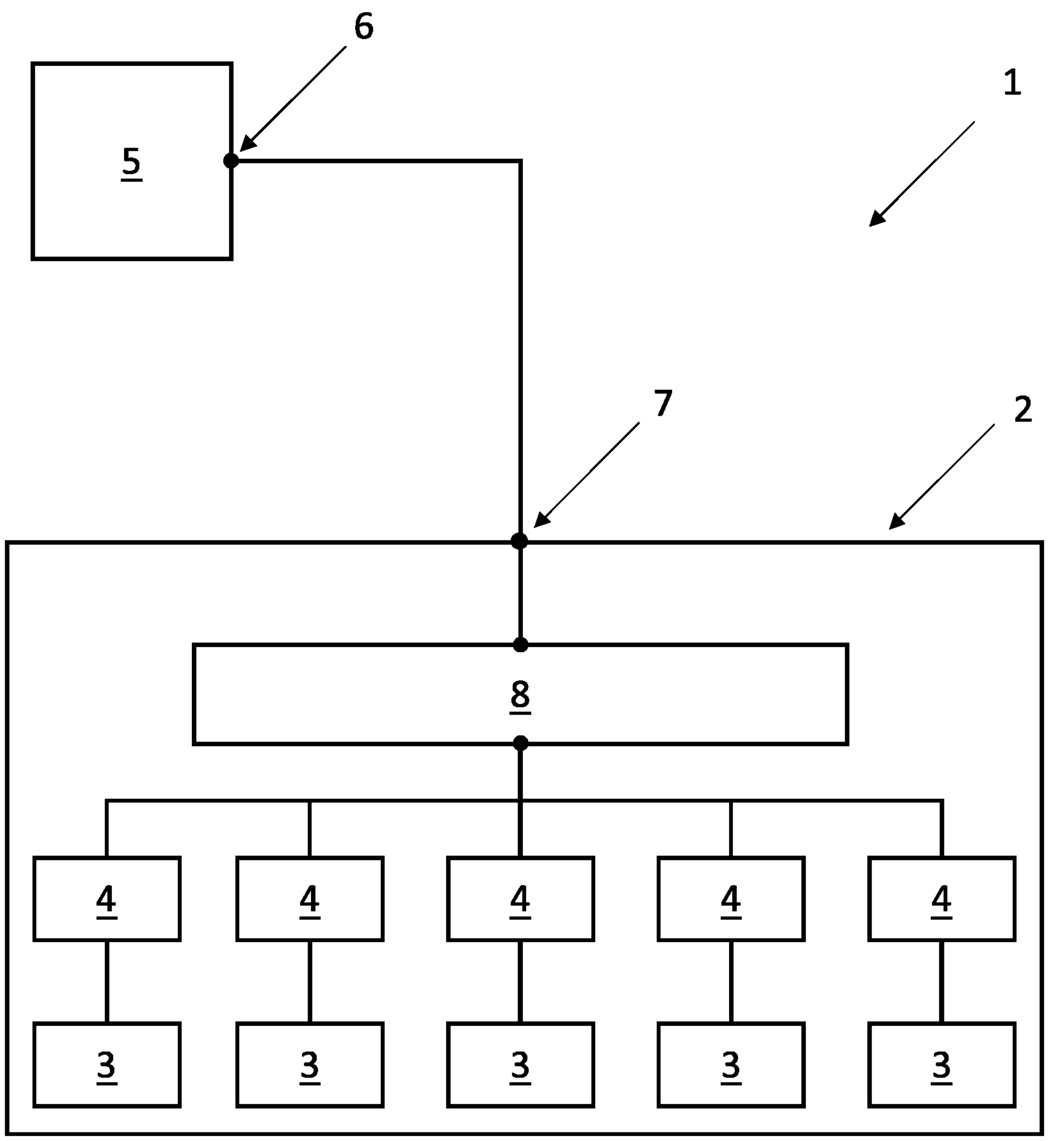
FIG. 1 is a schematic structure of an illumination device of the invention.

Illumination device 1 of the invention shown in FIG. 1 comprises a light-emitting diode field 2 formed of five series circuits. Each series circuit comprises a light-emitting diode 3 and an adjustable current source 4. Each adjustable current source 4 delivers a pulse width modulated current with a pulse height to power the associated LED 3. The series circuits are connected in parallel. Furthermore, light-emitting diode field 2 comprises a decoder 8, which is connected at its output to each adjustable current source 4.

In addition to light-emitting diode field 2, illumination device 1 comprises an open-loop and/or closed-loop controller 5. Open-loop and/or closed-loop controller 5 is connected via a video output 6 to a video signal input 7 of the light-emitting diode field and to the decoder 8.

Open-loop and/or closed-loop controller 5 is used to produce a setpoint value 22 for a pulse height of the pulse width modulated current for each adjustable current source 4. Furthermore, open-loop and/or closed-loop controller 5 determines a brightness value for each LED 3 in accordance with setpoint value 22 for the pulse height of the adjustable current source 4 assigned to each LED 3. Both setpoint value 22 for the pulse height of the current and the brightness value for each LED 3 are encoded in a video signal and provided at video signal output 6 of open-loop and/or closed-loop controller 5.

Decoder 8 decodes the brightness value from the video signal for each LED 3 and converts it into a duty cycle. Similarly, setpoint values 22 for the pulse height of the current are decoded from the video signal by decoder 8. Both the duty cycles and setpoint values 22 for the pulse height of the current are provided at the output of the decoder and are used by the adjustable current sources 4 to set the current level, i.e., the pulse height of the pulse width modulated current supplying the respective associated light-emitting diode 3.

Figure 2:
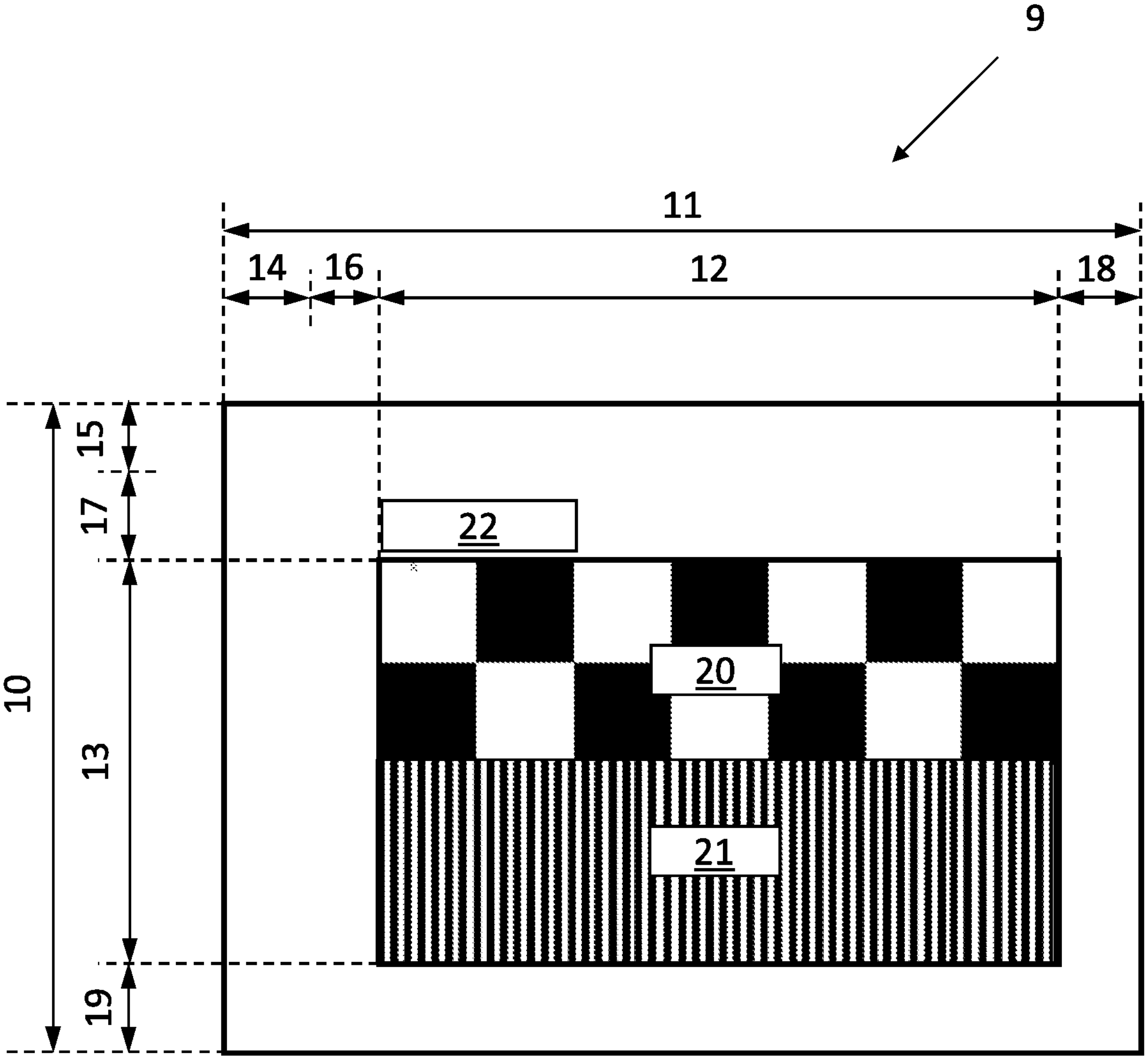
FIG. 2 is a schematic structure of a single video image of the video signal.

FIG. 2 shows the schematic structure of a single video frame 9 of the video signal used to transmit setpoint values 22 for the pulse height of the current to light-emitting diode field 2.

Video image 9 has a total height 10 and a total width 11. Total height 10 is divided into four regions 13, 15, 17, 19. The first region indicates the active height 13. Vertical front porch 19 is adjacent to the first region in the lower region of the image, and vertical back porch 17 in the upper region of the image. Furthermore, a region of vertical synchronization 15 adjoins vertical back porch 17.

The total width 11 is also divisible into four regions 12, 14, 16, 18. The first region indicates the active width 12; this is enclosed in the right part of the image by horizontal front porch 18 and in the left part of the image by horizontal back porch 16. A region of horizontal synchronization 14 is adjacent to horizontal back porch 16.

The useful information of the video signal is transmitted in the region spanned by the active height 13 and active width 12. This region is in turn divisible into a first video field 20 and a second video field 21. The brightness values of the individual LEDs 3 are encoded in 16383 pixels for each video field 20, 21.

The unused area of the video image, the blanking area, is outside the area spanned by the active height 13 and active width 12. Vertical back porch 17, in which setpoint values 22 for the pulse height of the current are transmitted, also belongs to this blanking area.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An illumination device for a motor vehicle, the illumination device comprising:

a light-emitting diode field having n LEDs, wherein n>1; and an adjustable current source for at least two of the LEDs, each adjustable current source providing a pulse width modulated current having a pulse height to power the associated LED;

an open-loop and/or closed-loop controller for the open-loop and/or closed loop control of the brightness of the LEDs of the light-emitting diode field, wherein the open-loop and/or closed-loop controller provides a setpoint value for the pulse height of the pulse width modulated current at least for each adjustable current source, wherein a brightness value is specified with the open-loop and/or closed-loop controller for each LED in accordance with the setpoint value for the pulse height of the adjustable current source associated with the LED and encoded in a video signal and provided at a video signal output, wherein the light-emitting diode field has a video signal input, which is connected to the video signal output of the open-loop and/or closed-loop controller, wherein the light-emitting diode field has a decoder which is connected to the video signal input and via which the brightness value is decoded from the video signal for each LED and converted into a duty cycle with which the pulse width modulated current is produced by the adjustable current source associated with the LED with the pulse height in accordance with the setpoint value predetermined for the adjustable current source by the open-loop and/or closed-loop controller, and wherein the setpoint values for the pulse height of the pulse width modulated current are adapted to be encoded in the video signal by the open-loop and/or closed-loop controller and also adapted to be decoded from the video signal by the decoder and used by the adjustable current sources to set a level of the pulse width modulated current or the pulse height of the pulse width modulated current.

2. The illumination device according to claim 1, wherein the video signal is an RGB signal.

3. The illumination device according to claim 1, wherein the setpoint values for the pulse height of the pulse width modulated current are encoded in the area not used for the brightness values or a blanking area of the video signal.

4. The illumination device according to claim 1, wherein the adjustable current sources operate according to a master slave principle, wherein at least one of the adjustable current sources as a master specifies the pulse height of the pulse width modulated current and transmits the pulse height of the pulse width modulated current to the remaining adjustable current sources.

5. The illumination device according to claim 1, further comprising a constant brightness value for each LED of the light-emitting diode field, and a simultaneous change of the setpoint values for the pulse height of the pulse width modulated current and the duty cycles is possible.

6. A motor vehicle comprising the illumination device according to claim 1.

7. A method for operating the illumination device according to claim 1, the method comprising:

producing, via the open-loop and/or closed-loop controller, a setpoint value for a pulse height of the pulse width modulated current at least for each adjustable current source associated with an LED;

providing the setpoint value and specifying a brightness value for each LED in accordance with the setpoint value for the pulse height;

encoding, via the open-loop and/or closed-loop controller, the setpoint value for the pulse height of the pulse width modulated current and the brightness value for each LED in a video signal and providing the encoded setpoint value at a video signal output;

decoding, via a decoder connected to a video signal input of the light-emitting diode field, the brightness value from the video signal for each LED and converting the brightness value into a duty cycle;

decoding, via the decoder, the setpoint values for the pulse height of the pulse width modulated current; and using, by the adjustable current sources, the decoded setpoint values to set a level of the pulse width modulated current or the pulse height of the pulse width modulated current.

8. The method according to claim 7, wherein, with constant brightness values for each LED of the light-emitting diode field, a substantially simultaneous change of the setpoint values for the pulse height of the pulse width modulated current and the duty cycles is possible.

9. The illumination device according to claim 1, wherein the illumination device is a high-resolution headlight.

* * * * *